United States Patent
Power et al.

(10) Patent No.: US 9,483,783 B1
(45) Date of Patent: Nov. 1, 2016

(54) PURCHASE SYSTEM USING A COMPUTING DEVICE

(75) Inventors: Michael Power, San Jose, CA (US); Dante Emilio Cassanego, Mountain View, CA (US); Harish Krishna Subramanian, Mountain View, CA (US); See Yew Mo, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1893 days.

(21) Appl. No.: 12/104,341

(22) Filed: Apr. 16, 2008

(51) Int. Cl.
*G06Q 30/00* (2012.01)
*G06F 17/30* (2006.01)
*G06Q 30/06* (2012.01)

(52) U.S. Cl.
CPC .................. *G06Q 30/0601* (2013.01)

(58) Field of Classification Search
CPC ................................... G06Q 30/0601
USPC ................................. 705/26.1–27.2
See application file for complete search history.

(56) References Cited

U.S. PATENT DOCUMENTS

| | | | |
|---|---|---|---|
| 5,960,411 | A | 9/1999 | Hartman et al. |
| 7,885,899 | B1* | 2/2011 | Sancho ........................... 705/67 |
| 2003/0069964 | A1* | 4/2003 | Shteyn et al. ................ 709/225 |
| 2004/0122685 | A1* | 6/2004 | Bunce ................................. 705/1 |
| 2006/0004659 | A1* | 1/2006 | Hutchison et al. ............. 705/40 |
| 2006/0037083 | A1* | 2/2006 | Kortum et al. ................. 726/28 |
| 2006/0178986 | A1* | 8/2006 | Giordano et al. .............. 705/40 |
| 2008/0040233 | A1* | 2/2008 | Wildman et al. ............... 705/26 |
| 2008/0103984 | A1* | 5/2008 | Choe et al. ...................... 705/76 |
| 2008/0109362 | A1* | 5/2008 | Fransdonk ....................... 705/51 |
| 2008/0208693 | A1* | 8/2008 | Milstein et al. ................ 705/14 |
| 2008/0301056 | A1* | 12/2008 | Weller et al. ................... 705/67 |
| 2009/0037296 | A1* | 2/2009 | Jaramillo ......................... 705/27 |
| 2009/0240622 | A1* | 9/2009 | Zandonadi ....................... 705/40 |
| 2009/0292619 | A1* | 11/2009 | Kagan et al. ................... 705/26 |

OTHER PUBLICATIONS

MPP global solutions: Silva screen records select MPP to power online eCommerce. (Jan. 7, 2008). M2 Presswire Retrieved from http://search.proquest.com/docview/444585699?accountid=14753.*
Near Field Communication, What is Near Field Communication?, http://www.webopedia.com/TERM/N/Near_Field_Communication.html, Jul. 2006, 2 pages.

* cited by examiner

*Primary Examiner* — Kathleen Palavecino
(74) *Attorney, Agent, or Firm* — Osha Liang LLP

(57) ABSTRACT

The invention relates to a method for purchasing a product by a consumer using a computing device. The method includes transmitting product information from a payee to the computing device, obtaining a purchase request for the product from the computing device, wherein the purchase request comprises a security identifier input by the consumer, inferring a consumer identity based on the purchase request and consumer information, authorizing the consumer to access the consumer information based on the purchase request and the consumer identity, wherein the consumer information is used to purchase the product, and generating a purchase authorization for the product and sending the purchase authorization to the payee based on the purchase request and the consumer information.

23 Claims, 5 Drawing Sheets

PURCHASE SYSTEM USING A COMPUTING DEVICE

BACKGROUND OF INVENTION

Consumer purchases are an important part of today's economy. Numerous options are available to consumers regarding how one conducts and pays for daily purchases, such as traditional stores, catalogs, internet websites, and other providers. The average person uses some or all of these options for making purchases, often in a single day. When shopping activity is at a peak, a consumer can spend an inordinate amount of time making purchases, and an even longer time trying to account for and organize all of the receipts and invoices. Organizing one's finances can be difficult, particularly when the process involves dealing with an overwhelming array of receipts and invoices with vastly different formats, methods of delivery, billing cycles, and payment authorization processes.

On the other end of the spectrum, many consumers simply want to buy a single item from a website. However, in order to finish the purchasing process a consumer may be required to navigate numerous user interfaces and security hurdles to provide authentication and purchase information.

Most consumers today carry or have access to one or more computing devices (e.g., desktop computer, laptop computer, a mobile phone, personal digital assistant, a multimedia device, a compact computer, digital music player, a credit card terminal, and/or other portable electronic equipment). These computing devices are capable of increasingly complex functions, including wireless communication, image and computational processing, and/or storage of data. Even the user interfaces of most mobile computing devices can be modified to allow simple functions using both hard and soft keys (i.e., a button, located alongside a display device, which performs a function dependent on the text shown near it at that moment on the display). The local memory capability of these devices allows users to access the Internet via a browser application and maintain electronic records relevant to all aspects of consumer life.

SUMMARY OF INVENTION

In general, in one aspect, the invention relates to a method for purchasing a product by a consumer using a computing device. The method includes transmitting product information from a payee to the computing device, obtaining a purchase request for the product from the computing device, wherein the purchase request comprises a security identifier input by the consumer, inferring a consumer identity based on the purchase request and consumer information, authorizing the consumer to access the consumer information based on the purchase request and the consumer identity, wherein the consumer information is used to purchase the product, and generating a purchase authorization for the product and sending the purchase authorization to the payee based on the purchase request and the consumer information.

In general, in one aspect, the invention relates to a method for purchasing a product by a consumer using a computing device. The method includes obtaining product information on the computing device, instantiating a purchase request associated with production information, wherein the purchase request comprises a security identifier input by the consumer on the computing device, obtaining authorization to access consumer information based on the purchase request and an inferred consumer identity, wherein the consumer information is used to purchase the product, and receiving a transaction confirmation from a payee resulting from a purchase authorization for the product sent to the payee, wherein. the purchase authorization is based on the purchase request and the consumer information In general, in one aspect, the invention relates to a system for conducting a purchase of a product by a consumer. The system includes a computing device having functionality to obtain product information on the computing device, a user interface operatively connected to the computing device having functionality to instantiate a purchase request associated with production information, wherein the purchase request comprises a security identifier input by the consumer on the computing device, and a payment engine operatively connected to the computing device having functionality to transmit product information from a payee to the computing device, obtain a purchase request for the product from the computing device, infer a consumer identity based on the purchase request and consumer information, authorize the consumer to access the consumer information based on the purchase request and the consumer identity, wherein the consumer information is used to purchase the product, and generate a purchase authorization for the product and sending the purchase authorization to the payee based on the purchase request and the consumer information.

In general, in one aspect, the invention relates to a computer readable medium storing instructions for purchasing a product by a consumer using a computing device. The instructions having functionality to transmit product information from a payee to the computing device, obtain a purchase request for the product from the computing device, wherein the purchase request comprises a security identifier input by the consumer, infer a consumer identity based on the purchase request and consumer information, authorize the consumer to access the consumer information based on the purchase request and the consumer identity, wherein the consumer information is used to purchase the product, and generate a purchase authorization for the product and sending the purchase authorization to the payee based on the purchase request and the consumer information.

In general, in one aspect, the invention relates to a computer readable medium storing instructions for purchasing a product by a consumer using a computing device. The instructions comprising functionality to obtain product information on the computing device, instantiate a purchase request associated with production information, wherein the purchase request comprises a security identifier input by the consumer on the computing device, obtain authorization to access consumer information based on the purchase request and an inferred consumer identity, wherein the consumer information is used to purchase the product, and receive a transaction confirmation from a payee resulting from a purchase authorization for the product sent to the payee, wherein. the purchase authorization is based on the purchase request and the consumer information Other aspects of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to conducting the purchase of a product using a computing device. More specifically, one or more embodiments of the invention relate to a user interface that allows a payee to transmit product information to the computing device, obtain a purchase request (including a security identifier) for the product from the computing device, infer a consumer identity, authorize the consumer to access the consumer information based on the purchase request and consumer identity, and generate a purchase authorization for the product that is sent to the payee. Further, a transaction confirmation may be received by the computing device from the payee resulting from the purchase authorization.

Figure 1:
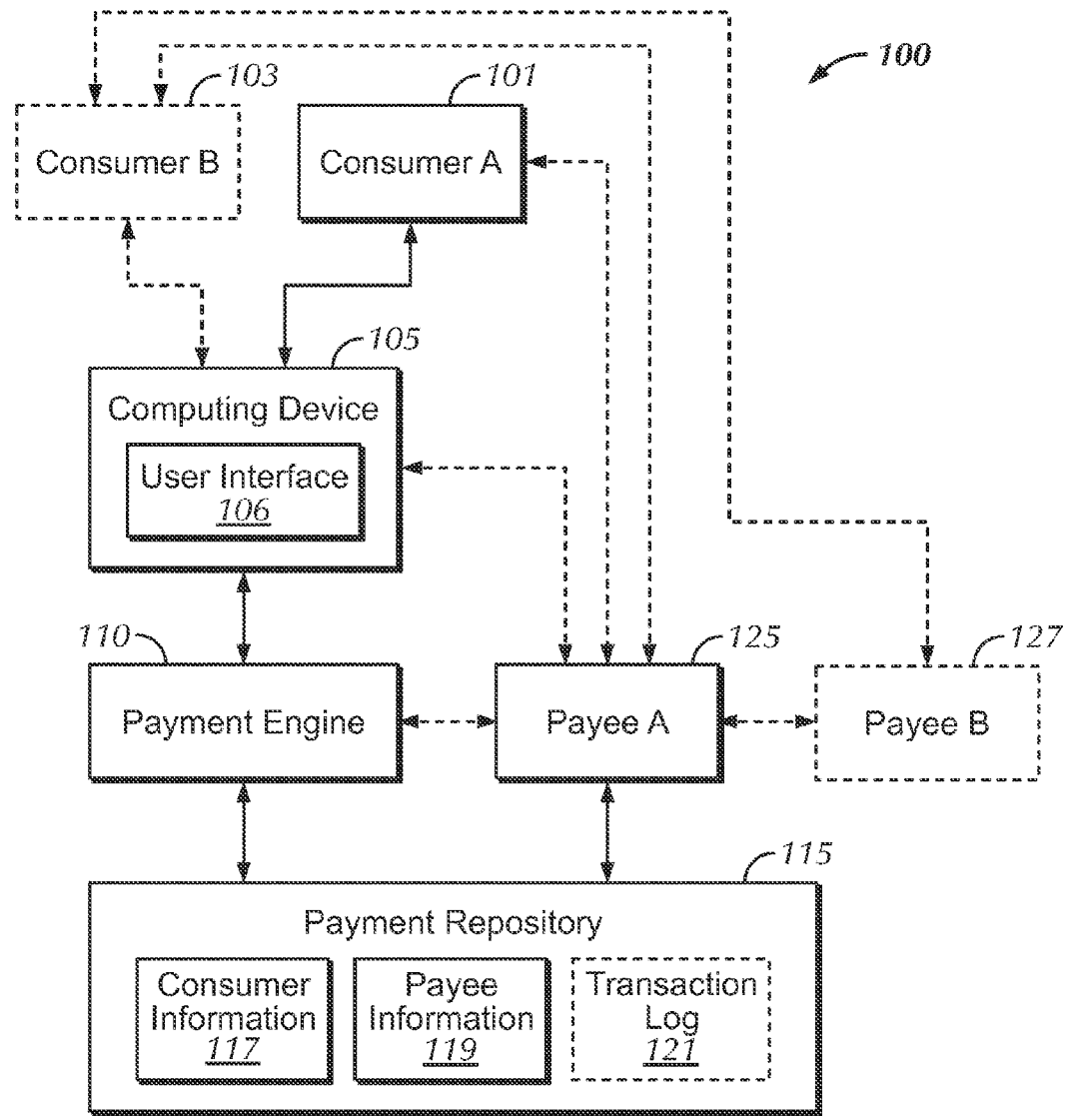
FIG. 1 shows a purchase system in accordance with one or more embodiments of the invention.

FIG. 1 shows a diagram of a purchase system in accordance with one or more embodiments of the invention. As shown in FIG. 1, the purchase system (100) includes one or more consumer(s) (e.g., Consumer A (101) and/or Consumer B (103)), a computing device (105), a payment engine (110), a payment repository (115), and one or more payee(s) (e.g., Payee A (125) and/or Payee B (127)). Each is described below.

In one or more embodiments of the invention, the consumer (e.g., Consumer A (101) and/or Consumer B (103)) is a party (or entity) that seeks to purchase a product (such as one or more goods and/or services) from one or more payees (e.g., Payee A (125) and/or Payee B (127)). The consumer may be the owner of the computing device and associated communication service(s). Alternatively, the consumer is an authorized user of the computing device and/or associated communication service(s). As FIG. 1 shows, multiple consumers (e.g., Consumer A (101) and Consumer B (103)) may be able to access a single computing device. Examples of a consumer may include an individual, a business entity, an employee or agent, a non-profit group, a governmental entity (such as a city, county, parish, state, commonwealth, municipality, township, country, space agency, etc.) and/or any other payor.

In one or more embodiments of the invention, the payee (e.g. Payee A (125) and/or Payee B (127)) is an entity that offers to sell a product (such as one or more goods and/or services) to one or more consumers (e.g., Consumer A (101) and/or Consumer B (103)). Multiple payees (e.g., Payee A (125) and/or Payee B (127)) may be offering the same product(s) sought by one or more consumers. Further, multiple consumers (e.g., Consumer A (101) and/or Consumer B (103)) may seeking product(s) with a single payee (e.g., Payee A (125)). In one or more embodiments of the invention, a first payee (e.g., Payee A (125)) offers one or more products to a consumer through a second payee (e.g., Payee B (127)) (as a third party) if the first payee (e.g., Payee A (125)) is unavailable and/or no longer offers the product(s). In such cases, the consumer (e.g., Consumer B (103)) may initially interact with the first payee (e.g., Payee A (125)), but eventually begins interacting directly with the second payee (e.g., Payee B (127)). Alternatively, the consumer (e.g., Consumer A (101)) interacts only with the first payee (e.g., Payee A (125)), who then interacts with the second payee (e.g., Payee B (127)) such that the consumer (e.g., Consumer A (101)) is completely unaware of the existence of the second payee (e.g., Payee B (127)

The payee(s) (e.g., Payee A (125) and/or Payee B (127)) may be associated with various types of businesses and products, such as a website, store, point-of-sale (POS) terminal, restaurant, consumer network, financial institution, bill-pay service, or any other consumer product provider with whom the consumer conducts a purchase transaction. Examples of a payee (e.g., Payee A (125) and/or Payee B (127)) may include an individual, a business entity, a non-profit group, a governmental agency, or any other entity that is owed money for products consumed by the consumer.

In one or more embodiments of the invention, a communication protocol (not shown and generally known in the art) facilitates the transfer and presentation (e.g., display) of product information between the computing device (105) and a payment engine (110). Further, transfer of information may also occur directly between the computing device (105) and the payee(s) and/or the payment engine (100) and the payee(s) (without routing information through the payment repository (115)).

In one or more embodiments of the invention, the computing device (105) may be used by a consumer or someone authorized by the consumer to conduct the purchase of a product. The computing device (105), as described below in FIG. 5, includes functionality to obtain input from one or more consumers and/or receive product information from a payee, send a purchase request (including a security identifier) for the product to one or more payees (either directly or through the payment engine (110)), and receive a transaction confirmation from the payee resulting from a purchase authorization. Both the input and output from the computing device (105) may be presented (e.g. displayed) on the computing device (105) and/or viewed by the consumer for some period of time.

In one or more embodiments of the invention, the product information, purchase request, and other transaction information are displayed on the computing device using a user interface (106), such as a graphical user interface (GUI). The user interface (106) may be configured to allow entry of data using, for example, a data entry field(s), to display data received from the payee (e.g., Payee A (125) or Payee B (127)) or payment engine (110) in a multitude of formats, such as graphics, text, digital images, multimedia, etc., and to allow the consumer to modify the product information, for example, by increasing the number of items selected or deleting an item from the purchase request. In one or more embodiments, the user interface (106) may be configured to save transaction information, for example, product information, a transaction confirmation, or a purchase request.

In one or more embodiments of the invention, the payment engine (110) is configured to transmit and receive information from the computing device (105) (using a secured network or other means to limit accessibility to such information), infer and validate the user identity of the consumer, access consumer information (117) and payee information (119) (both described below), and generate authorization from the consumer for payment to the payee using the computing device (105). Further, the payment engine (110) may be configured to accept input (e.g. from a computing device, website server, point of sale terminal and/or agent, computer, etc.) from the consumer (e.g., Consumer A (101) or Consumer B (103)), the payee(s) (e.g., Payee A (125) and/or Payee B (127)), and/or any other interested party that provides information associated with payment of the payee.

In one or more embodiments of the invention, the payment engine (110) is configured to send product information to the computing device (105), and to obtain, from the computing device (105), a purchase request associated with such product information. In one or more embodiments of the invention, the payment engine (110) is configured to infer the identity of the consumer (101) based on the purchase request and other information, and authorize access to certain consumer information (117), as described below, based on such inferred consumer identity and the purchase request. In one or more embodiments of the invention, the payment engine (110) is configured to generate and send a purchase authorization (not shown) to the payee based on the purchase request and the consumer information (117). In one or more embodiments of the invention, the payment engine (110) may be configured to pay the payee(s) (e.g., Payee A (125) and/or Payee B (127)) on behalf of the consumer (e.g., Consumer A (101) or Consumer B (103)), either directly or through a third party payment service. In one or more embodiments of the invention, the payment engine (110) may be configured to generate and send a transaction confirmation, based on the purchase authorization, to the computing device (105). In one or more embodiments of the invention, the payment engine (110) may be configured to transmit and synchronize transaction data, such as that stored in the payment repository discussed below, to a financial management software associated with the consumer (e.g., Consumer A (101)).

In one or more embodiments of the invention, all or a portion of the payment engine (110) resides on a server associated with the payee (e.g., Payee A (125) and/or Payee B (127)) of the consumer (e.g., Consumer A (101) and Consumer B (103)). In one or more embodiments of the invention, all or a portion of the payment engine (110) resides on a third party server. For example, the third party server may be associated with a bill-pay service, a financial institution, a credit card company, an internet financial service, or other similar payment service provider. In one or more embodiments of the invention, all or a portion of the payment engine (110) resides on the computing device (105), or a server associated with the computing device (105), or an associated communication service provider.

In one or more embodiments of the invention, the payment engine (110) interfaces with a payment repository (115) configured to store information. The payment repository (115) may be a relational database, a hierarchical (flat) file, or any other datastore well known in the art. In one or more embodiments of the invention, access to the payment repository (115) is restricted to protect the highly confidential information stored therein. For example, access to the payment repository (115) may require authentication using a password, one or more secret questions, a personal identification number (PIN) unique to the particular consumer, and/or any other processes or network architecture necessary to prevent or restrict access by unauthorized parties. Those skilled in the art will appreciate that elements stored in the payment repository (115) may be distributed and stored in multiple data repositories accessible across one or more networks, file systems, etc.

In one or more embodiments of the invention, all or a portion of the payment repository (115) resides on a server (not shown) associated with the payment engine (110). In one or more embodiments of the invention, all or a portion of the payment repository (115) resides on a server associated with the payee (e.g., Payee A (125) and/or Payee B (127)) of the consumer (e.g., Consumer A (101) and Consumer B (103)). In one or more embodiments of the invention, all or a portion of the payment repository (115) resides on a third party server. For example, the third party server may be associated with a bill-pay service, a financial institution, a credit card company, an internet financial service, or other similar payment service provider. In one or more embodiments of the invention, all or a portion of the payment repository (115) resides on the computing device (105), or a server associated with the computing device (105) or an associated communication service provider.

In one or more embodiments of the invention, the payment repository (115) is configured to store consumer information (117) and/or payee information (119). The payment repository (115) may also be configured to store transaction data associated with the consumer purchase, such as a transaction log (121).

In one or more embodiments of the invention, consumer information (117) includes information associated with a consumer purchase transaction. For example, consumer information (117) may include, but is not limited to, security information, such as user identities and passwords, consumer contact information, including consumer billing and mailing address information, and consumer financial information, such as preferred method of payment(s), consumer bank accounts, consumer payment accounts, and/or consumer credit card information. Consumer information (117) may also include detailed information about websites or product/service providers associated with the consumer that is useful when performing a webpage (or website) scraping (i.e., a technique in which a computer program extracts text data or structure from the display output of a webpage or website). In one or more embodiments of the invention, the consumer information may be obtained directly from the consumer (e.g., Consumer A (101) or Consumer B (103)), from the payee (e.g., Payee A (125) or Payee B (127)), or from another source. For example, the consumer may first register with a particular website, store, POS terminal, or other consumer product provider. Such registration could include, but is not limited to, providing acceptance of terms of payment authorization, consumer information, computing device identifier information, security information, etc. Registration may be conducted using the internet, in person, by telephone, or by any other means.

In one or more embodiments of the invention, payee information (119) includes information associated with a payee that is authorized to distribute a product pursuant to a consumer's purchase request. For example, payee information (119) may include, but is not limited to, payee contact information and financial information, such as information necessary to process a payment to the payee on behalf of the consumer (e.g., Consumer A (101) and Consumer B (103)). For example, payee information (119) may include a credit card number, an expiration date, a PIN access code or other security code, the billing address or zip code, the full name of the authorized user(s) for a credit card, or other vital information necessary to complete a transaction. In one or more embodiments of the invention, the payee information may be obtained directly from the consumer (e.g. Consumer A (101) or Consumer B (103)), from the payee (e.g. Payee A (125) or Payee B (127)), or from another source. For example, the payee (e.g. Payee A (125) or Payee B (127)) may provide payee information (119) as part of registering for, or licensing, a computing device purchase system from a third party provider, or provided in a database or clearinghouse system for consumer purchases.

In one or more embodiments of the invention, the payee information (119) is secured by an authentication and/or encryption scheme and any transfer of the information is also performed in a secure manner consistent with the transfer of any sensitive financial information.

In one or more embodiments of the invention, the transaction log (121) may be used to confirm a purchase. For example, the transaction log (121), stored on the payment repository (115), can be searched for transactions associated with the consumer(s) (e.g., Consumer A (101) and/or Consumer B (103)) or the payee(s) (e.g., Payee A (125) and/or Payee B (127)). In one or more embodiments of the invention, the payment engine (110) is configured to transmit and synchronize transaction data to/from the transaction log (121) stored in the payment repository (115). Further, the payment engine (110) may be configured to transmit and synchronize transaction data between the payment repository (115) and financial management software (not shown) and/or a computing device associated with the consumer (e.g., Consumer A (101) and Consumer B (103)).

Figure 2:
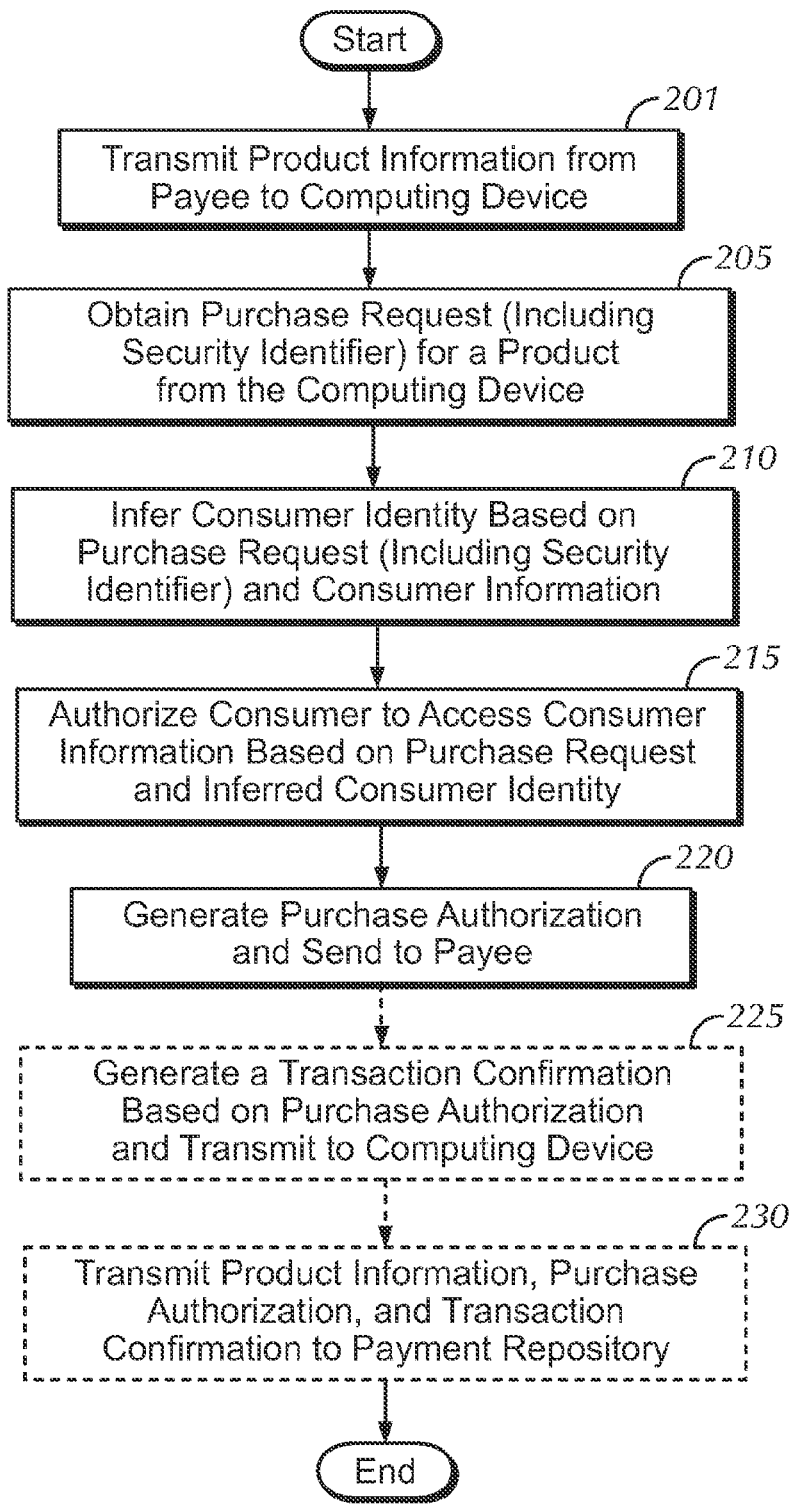
FIG. 2 shows a flow chart in accordance with one or more embodiments of the invention.

FIG. 2 shows a flow chart for making a consumer purchase using a computing device in accordance with one or more embodiments of the invention. Those skilled in the art will recognize that certain steps may precede those shown in FIG. 2. For example, the consumer may need to first register with a particular website, store, or other consumer product provider.

In Step 201, product information is transmitted from a payee to a computing device in accordance with one or more embodiments of the invention. Such product information may be presented on the computing device in many forms, such as text, graphics, or other multimedia. In one or more embodiments of the invention, the product information is presented in an interactive format, allowing the consumer to modify the product information. For example, modifications may include changing the type or number of selected items, the method of payment, the billing or shipping address, removing an item, viewing alternative item(s) or information regarding the item(s), etc. In one or more embodiments of the invention, upon receiving a change request from the computing device, the product information is appropriately modified and (potentially) re-sent to the computing device.

In Step 205, a purchase request (including the security identifier) for a product is obtained from the computing device in accordance with one or more embodiments of the invention. In one or more embodiments of the invention, the purchase request is obtained by the payment engine. In one or more embodiments of the invention, the purchase request involves entering a security identifier into a data entry field presented (e.g., on a monitor, display screen, audibly, etc.) by the user interface on the computing device. The security identifier may include a security password, a PIN code, biometrics, or any other process or network architecture necessary to prevent access by unauthorized parties. Those skilled in the art will appreciate that the payment request and authorization may be conducted using a multitude of techniques known in the art.

Figures 3A, 3B:
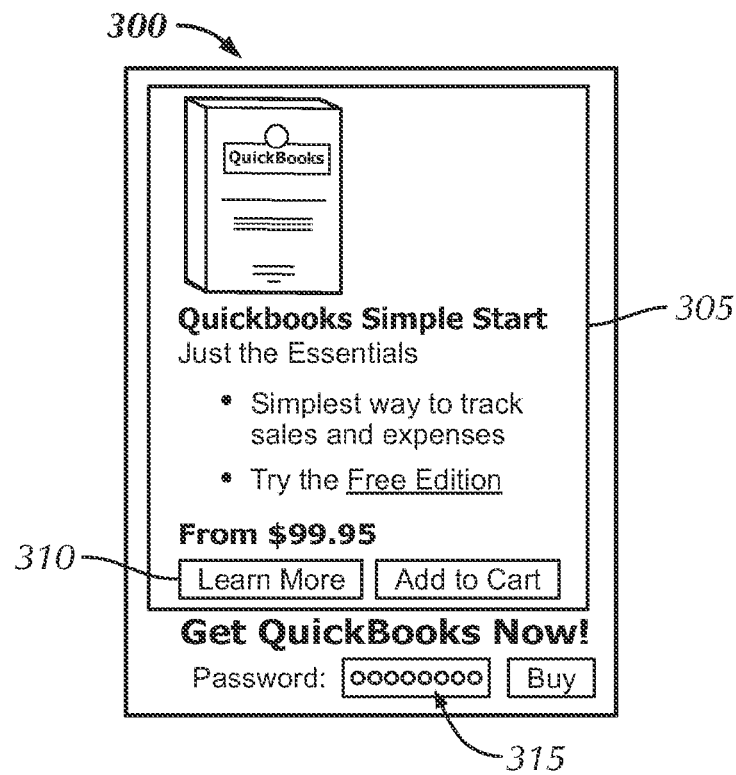
FIGS. 3A and 3B show purchase requests in accordance with one or more embodiments of the invention.

In one or more embodiments of the invention, a consumer purchase may be conducted in a virtual context. For example, FIG. 3A shows an example of a purchase request (300) for a product purchased by a consumer (or an agent thereof) from an internet website, such as www.intuit.com/products/, in accordance with one or more embodiments of the invention. As shown in FIG. 3A, the user interface may present product information (305) in both graphical and textual format. The modification option (310) may be activated, for example, by selecting a "Learn more" button that navigates the consumer to a page displaying the product information (305) or a completely different product. To issue a purchase request (300) for product displayed in the product information (305) and authorize payment, the consumer only enters a security identifier (315), in this case a password, into a data entry field of the user interface. In one or more embodiments of the invention, the security identifier may be any unique identifier of the consumer that is known to the both the consumer and stored as consumer information in the payment repository, which is then accessible by one or more payees. Further, in one or more embodiments of the invention, all or a portion of the transaction occurs on the consumer's computing device.

In one or more embodiments of the invention, the consumer purchase may be conducted at a physical location, such as a store, point of sale terminal, restaurant, mail order, or other transaction location. FIG. 3B shows an example of another type of purchase request (320) in accordance with one or more embodiments of the invention. In this example, the consumer (or an agent thereof) selects products to purchase at an office supply store. In one or more embodiments of the invention, the products selected are processed and the product information, in the form of an invoice, is transmitted to a computing device and displayed by a user interface. The consumer may then transmit a purchase request (320) by only entering a security identifier (325), in this case a password, into the appropriate data entry field on the user interface. Based on the simple entry of the security identifier, the consumer identity may be inferred and a payment authorization is generated and sent to the payee, as described below.

Returning to FIG. 2, the identity of the consumer is inferred based on the purchase request (including the security identifier) and consumer information (Step 210), in accordance with one or more embodiments of the invention. In one or more embodiments of the invention, the consumer identity is inferred using information associated with the computing device and the transaction itself. For example, the payment engine may access relevant information stored in the cache memory of the computing device or obtain meta data from the communication of the transaction itself that, combined with the security identifier, results in inferring the identity of the consumer. Relevant information may include, for example, the Internet Protocol (IP) address of the computing device, the computing device identifier (such as a mobile device identifier), stored information of the consumer located on the storage medium of a computing device or within packets sent during the transaction (such as shipping address, credit card number, bank account information, or other unique personal information), patterns of usage, or other data provided by the consumer or the payee. In one or more embodiments of the invention, the information and/or meta data obtained from the computing device is compared to the consumer information, or a profile associated with the consumer information, stored in the payment repository.

In Step 215, the consumer is authorized to access consumer information based on the purchase request and inferred consumer identity. In one or more embodiments of the invention, the consumer is authorized to access the consumer information, including payment information (i.e., credit card information, expiration dates, security codes, PIN information, etc.), based on the purchase request, including a security identifier and product, and the inferred consumer identity. In one or more embodiments of the invention, this process may be referred to as validation and the consumer as validated with regard to a particular payee.

In Step 220, a purchase authorization is generated and sent to the payee based on the purchase request and the consumer information in accordance with one or more embodiments of the invention. In one or more embodiments of the invention, the generation of the purchase request may be electronic or manual. Further, the purchase authorization may be generated in one or more proprietary and/or secured formats as required or requested by one or more payees. Further, one or more payee may provide instructions that the purchase authorization be divided in multiple portions with each portion to be sent to multiple payees based on agreements and/or distribution channels unknown to the consumer.

In one or more embodiments of the invention, a transaction confirmation may be optionally generated based on purchase authorization and transmitted to the computing device (Step 225). The transaction confirmation may replace a traditional paper receipt and provide an electronic version of the transaction to memorialize the transaction and provide support for any transaction disputes that may arise. Further, the transaction confirmation can allow the consumer to easily obtain the same purchase request or a modified version of the purchase request for a product in Step 205 (and repeat the process).

In one or more embodiments of the invention, the product information, purchase authorization, and/or transaction confirmation is transmitted to the payment repository (Step 230). The product information, purchase authorization, and/or transaction confirmation may be stored in the form of a transaction log or other such data file that can be retrieved by one or more authorized payees, consumers, or computing devices. For example, the consumer may be directed on how to save a copy of the transaction confirmation to the computing device, which is then transmitted to the payment repository and store in the transaction log. Similarly, the production information and purchase authorization may be saved in and/or retrieved from the transaction log in the event the consumer intends to repeat the purchase request and/or save the information for audit purposes, disaster recovery, or other financial recordkeeping.

Figure 4:
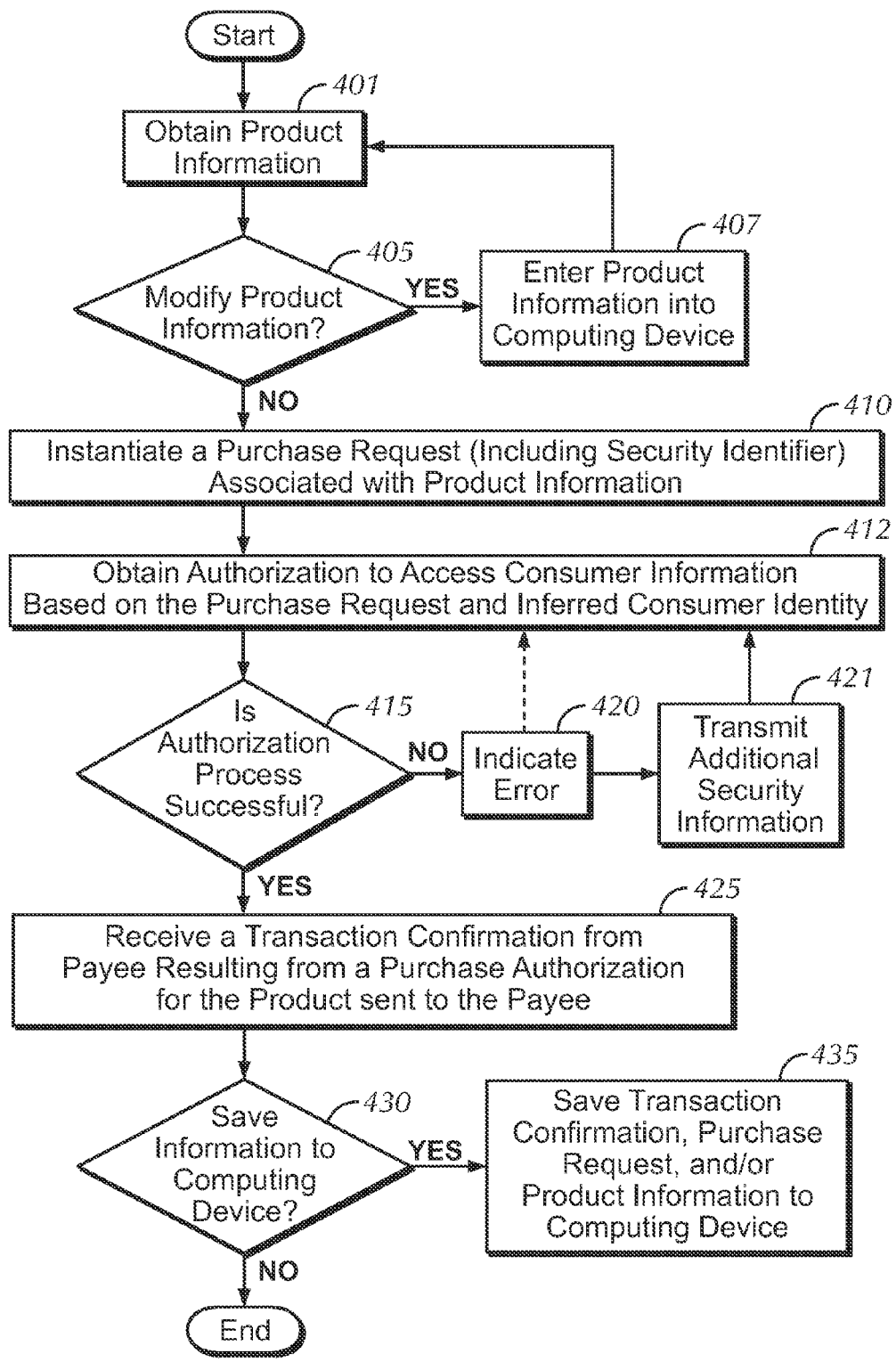
FIG. 4 shows a flow chart in accordance with one or more embodiments of the invention.

FIG. 4 shows a flow chart for making a consumer purchase using a computing device in accordance with one or more embodiments of the invention. Those skilled in the art will recognize that certain steps may precede those shown in FIG. 4.

In Step 401, the consumer obtains product information on a computing device. As discussed above, the product information can take a variety of forms. For example, as the product may be downloaded from a website using a graphical user interface (FIG. 3A), or may be in the form of an invoice sent by a POS terminal (FIG. 3B).

In one or more embodiments of the invention, the consumer makes a determination whether to modify the product information (Step 405), If a decision is made to modify the product information (Step 407), then the modification of the product information may involve changing the product itself, changing the quantity of the object, adding suggested product complements or alternatives, deleting one or more product, choosing various options associated with one or more products, or other modifiable aspect of a product. In one or more embodiments of the invention, the product information is gathered and transferred interactively using a computing device associated with the consumer.

Once a decision is made not to modify the production information, the purchase request (including a security identifier), which is associated with production information, is instantiated (Step 410) in accordance with one or more embodiments of the invention. In one or more embodiments of the invention, the instantiation of the purchase request involves populating the request with the necessary information to gain authorization to access consumer information. Such information may include the consumer name, the computing device identifier, any data gathered during the transaction, additional security information (such as readily available data on the memory of the computing device including the user identity and other state information of the consumer). In one or more embodiments of the invention, state information refers to any additional consumer and security information that is necessary to complete the authorization process is automatically transmitted to an appropriate website server.

In one or more embodiments of the invention, the information gathered to instantiate the purchase request may be obtained from the consumer, the payee, the payment repository, financial institutions, the computing device, or other source of meaningful data. In one or more embodiments of the invention, the interface on the computing device may be configured to allow the user to manually enter the consumer identity (or other state information) into the computing device. For example, if the computing device is used by more than one consumer, it may be advantageous to configure the interface to allow manual entry of an identity or other state information.

In one or more embodiments of the invention, the consumer's computing device obtains authorization to access consumer information based on the purchase request and inferred consumer identity (Step 412). Specifically, by providing the necessary level of information (which is configurable) to the payment repository, the consumer's identity can be inferred and the consumer information made accessible. At this point, only the necessary payment information is exposed to complete the purchase request. Thus, by only entering a security identifier, authorization of a purchase request can be made by using the information surrounding the transaction along with other data either input by a user or obtained from the computing device itself.

In Step 415, a determination is made whether the authorization process is successful. In one or more embodiments of the invention, after an unsuccessful authorization process, the user is notified of the error (Step 420), optionally prompted to re-enter the security identifier, and returned to the authorization process at Step 412.

In one or more embodiments of the invention, if the authorization process is unsuccessful (Step 415) and an error is indicated (Step 420), then the consumer may transmit additional security information (such as manually enter a password and user identity) (Step 421) and the authorization process returns to Step 412 in an attempt to successfully complete the authorization. In one or more embodiments of the invention, the consumer uses the computing device to transmit the additional security information. Further, the security information required at this point is be more or less rigorous depending on the quality/quantity of data contained in the instantiated purchase request in accordance with one or more embodiments of the invention.

In Step 425, after a successful authorization process, the consumer receives transaction confirmation from one or more payees resulting from a purchase authorization for the product sent to the payee as part of the authorization process. Additional details, such as a description of the charge, payment history, or optional additional items for purchase, may be provided to the consumer. For example, the transaction data may be an invoice, an electronic receipt, a payment request, or other financial document.

In one or more embodiments of the invention, the consumer may be logged into a secured network for a predetermined time during the transaction. The period of time may be configured to limit accessibility to the consumer information. Further, a secured network may be associated transaction involved with the payment engine, the payee, or a third party handling the transaction.

In one or more embodiments of the invention, a communication protocol may format the purchase request so that it may be viewed on the display screen of the computing device. In one or more embodiments of the invention, the data used during the transaction is combined in a format prescribed by the communication protocol. For example, the data may be submitted as simple text command using a command interface, supplemented by a form interface allowing the transmission of both text, graphical, and/or multimedia data, submitted via a web page interface using standard markup language, or as a simple message syntax (SMS), etc. Those skilled in the art appreciate that the communication protocol may take other forms now known or later developed.

In Step 430, a determination whether to save information to the computing device is made. In one or more embodiments of the invention, if a decision is made to save the information, then the transaction confirmation, purchase request, and/or product information is saved to the computing device (Step 435). Optionally, the information may then be saved to a payment repository accessible by financial management software associated with the user of the computing device or directly to the financial management software associated with the user of the computing device.

Figure 5:
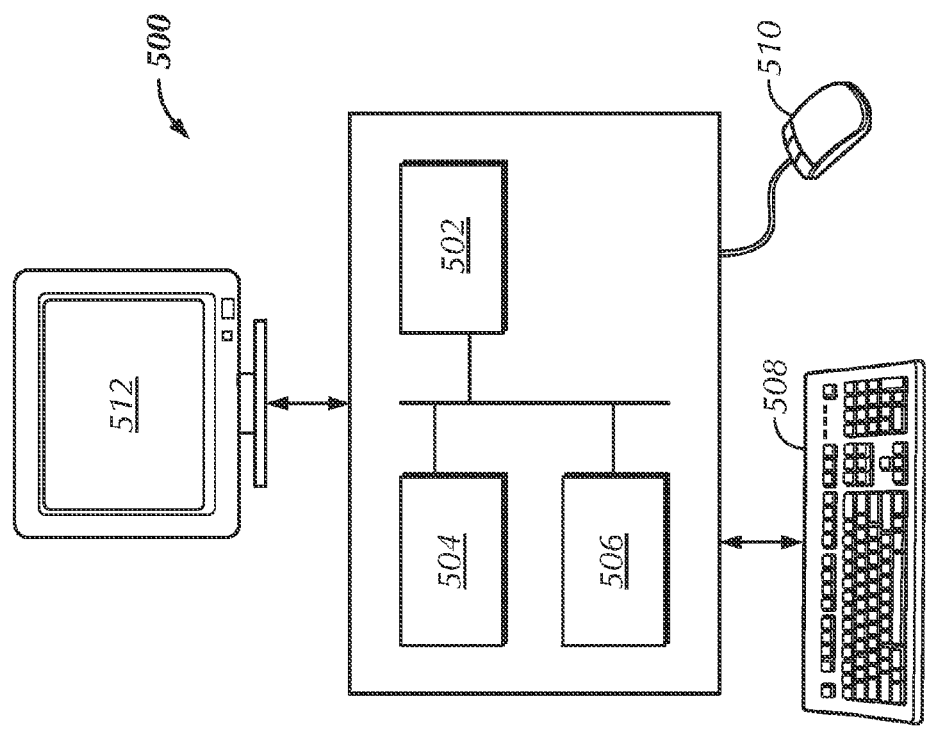
FIG. 5 shows a computing device in accordance with one or more embodiments of the invention.

Embodiments of the invention may be implemented on virtually any type of computing device regardless of the platform being used. For example, as shown in FIG. 5, a computing device (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computing device (500) may also include input means, such as a keyboard (508), a mouse (510), or a microphone (not shown). Further, the computing device (500) may include output means, such as a monitor (512) (e.g., a liquid crystal display (LCD), a plasma display, or cathode ray tube (CRT) monitor). The computing device (500) may be connected to a network (514) (e.g., a local area network (LAN), a wide area network (WAN) such as the Internet, or any other similar type of network) via a network interface connection. In one or more embodiments of the invention, the network connection may be facilitated by a wireless infrastructure (not shown), including one or more transceivers cooperating to facilitate wireless communications to wireless devices. Those skilled in the art will appreciate that many different types of computing devices exist, and the aforementioned input and output means may take other forms. Generally speaking, the computing device (500) includes at least the minimal processing, input, and/or output means necessary to practice embodiments of the invention.

Further, those skilled in the art will appreciate that one or more elements of the aforementioned computing device (500) may be located at a remote location and connected to the other elements over a network. Further, embodiments of the invention may be implemented on a distributed system having a plurality of nodes, where each portion of the invention (e.g., payment engine, payment repository, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Figure 6:
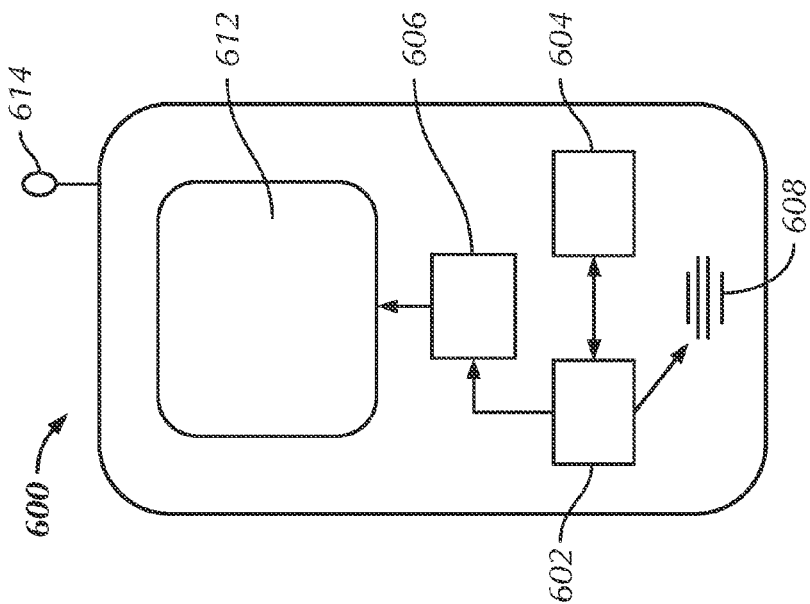
FIG. 6 shows a mobile device in accordance with one or more embodiments of the invention

In one or more embodiments of the invention, the computing device is a mobile device, such as the device described in association with FIG. 6. For example, as shown in FIG. 6, a mobile device (600), which is essentially the same as the computing device (105) in FIG. 1, may be a mobile device equipped with a processor (602), associated memory (604), a storage device (606), a receiver (608), a speaker (not shown), an antenna (614), and numerous other elements and functionalities typical of today's mobile devices (not shown). The mobile device (600) may also include input means, such as a keyboard (not shown) or touch screen (not shown) that permits a user to enter keystrokes including numeric, alphabetic, and other characters, and output means, such as a display screen (e.g., a liquid crystal display screen) (612). Those skilled in the art will appreciate that these input and output means may take other forms now known or later developed. The mobile device (600) may be connected to a network (e.g., a local area network (LAN), a wide area network (WAN) such as the Internet, or any other similar type of network) via a network interface connection (not shown). Examples of mobile devices include, but are not limited to, laptop computers, cellular phones, point of sale (POS) terminals, personal digital assistants, personal communicators, pagers, and smart phones. Using embodiments of the present invention, a consumer may conduct a purchase of a product on the mobile device (600).

In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (600) with a mobile device identifier of the mobile device (600). In one or more embodiments of the invention, the wireless infrastructure be a short range radio frequency communication used to exchange data with the mobile device, for example, radio-frequency identification (RFID) or extended capability RFID.

In one or more embodiments of the invention, the network connection may be facilitated by a hard wire or other similar connection. For example, the network connection may involve touching the mobile device, or placing the mobile device in close proximity to a POS terminal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authorizing a purchase, comprising:
   receiving, from a computing device operated by a consumer, a request to access a webpage of a merchant;
   transmitting, in response to the request, the webpage of the merchant comprising a plurality of product information and a password field to an application executing on the computing device,
   wherein the webpage of the merchant comprising the plurality of product information and the password field is displayed to the consumer by the application;
   receiving, from the application via computer network communication over the Internet, a purchase request for a product, wherein the consumer initiates the purchase request by populating the password field in the webpage of the merchant with a password, and wherein the purchase request comprises the password;
   inferring, by a computer processor external to the computing device, an identity of the consumer based solely on the password in the purchase request and a device identifier used for the computer network communication over the Internet, wherein inferring the identity of the consumer comprises:
      extracting, subsequent to displaying the password field to the consumer and from metadata of the computer network communication transmitting the purchase request, the device identifier of the computing device; and
      comparing the password and the device identifier to pre-registered information of the consumer,
      wherein the consumer does not provide a username, and
      wherein inferring the identity of the consumer is without further user intervention of the consumer subsequent to receiving the purchase request;
   identifying, based on the identity of the consumer, a plurality of payment information of the consumer; and
   generating, by the computer processor, a purchase authorization for the product based on the purchase request and the plurality of payment information.

2. The method of claim 1, further comprising:
   generating a transaction confirmation, responsive to the purchase request, based on the purchase authorization; and
   transmitting the transaction confirmation to the computing device.

3. The method of claim 2, further comprising:
   transmitting one selected from a group consisting of the plurality of product information, the purchase authorization, and the transaction confirmation to a payment repository.

4. The method of claim 1, further comprising:
   distributing the product using the plurality of payment information upon receiving the purchase authorization.

5. The method of claim 1, wherein the computing device is a mobile device.

6. A method for authorizing a purchase, comprising:
   obtaining, by a computing device of a consumer, a webpage of a merchant comprising a plurality of product information and a password field;
   displaying, by the computing device and to the consumer, the webpage of the merchant comprising the plurality of product information and the password field;
   receiving, from the consumer, a password for populating the password field of the webpage, wherein the consumer does not provide a username; and
   initiating, by the computing device via computer network communication over the Internet, a purchase request for a product, the purchase request comprising the password in response to the consumer populating the password field in the webpage,
   wherein the purchase request comprising the password is sent via the computer network communication to a payment engine external to the computing device, and
   wherein the payment engine:
      infers an identity of the consumer based solely on the password in the purchase request and a device identifier used for the computer network communication over the Internet, wherein inferring the identity of the consumer comprises:
         extracting, subsequent to displaying the password field to the consumer and from metadata of the computer network communication transmitting the purchase request, the device identifier of the computing device; and
         comparing the password and the device identifier to pre-registered information of the consumer,
      wherein inferring the identity of the consumer is without further user intervention of the consumer subsequent to receiving the purchase request;
      identifies a plurality of payment information of the consumer based on the identity; and
      receives a transaction confirmation from the payment engine resulting from a purchase authorization for the product, wherein the purchase authorization is based on the purchase request and the plurality of payment information.

7. The method of claim 6, further comprising:
   receiving the product from the merchant based on the plurality of payment information and the purchase authorization.

8. The method of claim 6, wherein the identity of the consumer is based on the purchase request and the plurality of payment information.

9. The method of claim 6, further comprising:
   storing one selected from a group consisting of the plurality of product information, the transaction confirmation, and the purchase request on the computing device; and
   accessing information stored on the computing device using a financial management software application.

10. The method of claim 6, further comprising:
    storing one selected from a group consisting of the plurality of product information, the transaction confirmation, and the purchase request on a payment repository; and
    accessing information stored on the payment repository using a financial management software application.

11. The method of claim 6, wherein the computing device is a mobile device.

12. A system for authorizing a purchase, comprising:
    a computing device operated by a consumer and comprising functionality to:

obtain a webpage of a merchant comprising a plurality of product information and a password field;

display, to the consumer, the webpage comprising the plurality of product information and the password field;

receive, from the consumer, a password for populating the password field;

initiate, via computer network communication over the Internet, a purchase request for a product in response to the consumer populating the password field of the webpage, wherein the purchase request comprises the password; and a payment engine comprising functionality to:

transmit the webpage comprising the plurality of product information and the password field to the computing device;

obtain, via the computer network communication, the purchase request for the product from the computing device;

infer an identity of the consumer based solely on the password in the purchase request and a device identifier used for the computer network communication over the Internet, wherein inferring the identity of the consumer comprises:

extracting, subsequent to displaying the password field to the consumer and from metadata of the computer network communication transmitting the purchase request, the device identifier of the computing device; and comparing the password and the device identifier to pre-registered information of the consumer, wherein the consumer does not provide a username, and wherein inferring the identity of the consumer is without further user intervention of the consumer subsequent to receiving the purchase request;

identify, based on the identity of the consumer, a plurality of payment information of the consumer; and generate a purchase authorization for the product based on the purchase request and the plurality of payment information.

13. The system of claim 12, wherein the payment engine further comprises functionality to:

generate, responsive to the purchase request, a transaction confirmation based on the purchase authorization; and transmit the transaction confirmation to the computing device.

14. The system of claim 12, wherein the payment engine further comprises functionality to:

send the purchase authorization to the merchant, wherein the purchase authorization comprises a payment for the product.

15. The system of claim 14, wherein the plurality of product information is obtained as web-based content via a website associated with the merchant.

16. The system of claim 12, further comprising:

a payment repository operatively connected to the payment engine and comprising functionality to store the plurality of payment information.

17. The system of claim 16, wherein the payment repository further comprises functionality to maintain a transaction log, wherein the transaction log is used to confirm a transaction corresponding to the purchase authorization.

18. The system of claim 16, wherein the payment repository further comprises functionality to store one selected from a group consisting of the plurality of product information and the purchase request.

19. The system of claim 16, wherein the payment engine further comprises functionality to transmit one selected from a group consisting of the plurality of product information and the purchase authorization to the payment repository.

20. The system of claim 16, wherein the payment engine comprises further functionality to transmit and synchronize a plurality of transaction data from the payment repository to a financial management software application.

21. The system of claim 12, wherein the payment engine further comprises functionality to transmit the purchase authorization over a secure network.

22. The system of claim 12, wherein the computing device is a mobile device.

23. A non-transitory computer readable medium storing a plurality of instructions for authorizing a purchase, the plurality of instructions comprising functionality to:

receive, from a computing device operated by a consumer, a request to access a webpage of a merchant;

transmit, in response to the request, the webpage of the merchant comprising a plurality of product information and a password field to an application executing on the computing device, wherein the webpage of the merchant comprising the plurality of product information and the password field is displayed to the consumer by the application;

receive, from the application via computer network communication over the Internet, a purchase request for a product, wherein the consumer initiates the purchase request by populating the password field in the webpage of the merchant with a password, and wherein the purchase request comprises the password;

infer an identity of the consumer based solely on the password in the purchase request and a device identifier used for the computer network communication over the Internet, wherein inferring the identity of the consumer comprises:

extracting, subsequent to displaying the password field to the consumer and from metadata of the computer network communication transmitting the purchase request, the device identifier of the computing device; and comparing the password and the device identifier to pre-registered information of the consumer, wherein the consumer does not provide a username, and wherein inferring the identity of the consumer is without further user intervention of the consumer subsequent to receiving the purchase request;

identify, based on the identity of the consumer, a plurality of payment information of the consumer; and generate a purchase authorization for the product based on the purchase request and the plurality of payment information.

* * * * *